US009594638B2

(12) United States Patent
Potlapally et al.

(10) Patent No.: US 9,594,638 B2
(45) Date of Patent: Mar. 14, 2017

(54) HOST RECOVERY USING A SECURE STORE

(71) Applicant: Amazon Technologies, Inc., Reno, NV (US)

(72) Inventors: Nachiketh Rao Potlapally, Arlington, VA (US); Rachit Chawla, Kirkland, WA (US); Jeremy Ryan Volkman, Seattle, WA (US); Michael David Marr, Monroe, WA (US)

(73) Assignee: Amazon Technologies, Inc., Reno, NV (US)

( * ) Notice: Subject to any disclaimer, the term of this patent is extended or adjusted under 35 U.S.C. 154(b) by 117 days.

(21) Appl. No.: 13/862,923

(22) Filed: Apr. 15, 2013

(65) Prior Publication Data

US 2014/0310509 A1  Oct. 16, 2014

(51) Int. Cl.
G06F 11/00 (2006.01)
G06F 11/14 (2006.01)
G06F 21/57 (2013.01)

(52) U.S. Cl.
CPC ........ *G06F 11/1417* (2013.01); *G06F 21/57* (2013.01)

(58) Field of Classification Search
CPC ...... G06F 21/575; G06F 11/1438; G06F 1/24; G06F 9/4418; G06F 9/4401; G06F 11/1417; G06F 11/1441; G06F 11/1402; G06F 11/1471; G06F 11/1464; G06F 11/2284; G06F 11/2294
USPC ................................................ 714/36; 713/2
See application file for complete search history.

(56) References Cited

U.S. PATENT DOCUMENTS

| 6,490,722 | B1 | 12/2002 | Barton et al. |
| 7,200,758 | B2 * | 4/2007 | Zimmer ........................ 713/192 |
| 7,506,209 | B2 * | 3/2009 | Kawata ........................... 714/36 |
| 7,506,380 | B2 * | 3/2009 | Hunter et al. ................... 726/26 |
| 7,530,103 | B2 * | 5/2009 | Willman et al. ................ 726/21 |
| 7,725,703 | B2 * | 5/2010 | Hunter et al. ...................... 713/2 |
| 8,433,924 | B2 * | 4/2013 | Challener et al. ............. 713/189 |

(Continued)

FOREIGN PATENT DOCUMENTS

WO  2014/172205  10/2014

OTHER PUBLICATIONS

USPTO Non-Final Office Action dated Mar. 16, 2015 for U.S. Appl. No. 13/863,296, 14 pages.

(Continued)

*Primary Examiner* — Elmira Mehrmanesh
(74) *Attorney, Agent, or Firm* — Hogan Levells US LLP

(57) ABSTRACT

Approaches are described for enabling a host computing device to store credentials and other security information useful for recovering the state of the host computing device in a secure store, such as a trusted platform module (TPM) on the host computing device. When recovering the host computing device in the event of a failure (e.g., power outage, network failure, etc.), the host computing device can obtain the necessary credentials from the secure store and use those credentials to boot various services, restore the state of the host and perform various other functions. In addition, the secure store (e.g., TPM) may provide boot firmware measurement and remote attestation of the host computing devices to other devices on a network, such as when the recovering host needs to communicate with the other devices on the network.

24 Claims, 8 Drawing Sheets

(56) References Cited

U.S. PATENT DOCUMENTS

| | | | |
|---|---|---|---|
| 8,732,527 B2* | 5/2014 | Tabone et al. .................. 714/36 |
| 8,789,037 B2* | 7/2014 | De Atley et al. ............. 717/175 |
| 8,977,679 B2* | 3/2015 | Van Biljon ............ G06Q 30/04 709/203 |
| 2002/0087877 A1* | 7/2002 | Grawrock ..................... 713/200 |
| 2003/0226059 A1* | 12/2003 | Braun ................. G06F 11/0748 714/20 |
| 2004/0210796 A1 | 10/2004 | Largman et al. |
| 2006/0161769 A1 | 7/2006 | Hunter et al. |
| 2008/0215872 A1 | 9/2008 | Choi et al. |
| 2008/0235505 A1* | 9/2008 | Hobson et al. ............... 713/100 |
| 2008/0270071 A1 | 10/2008 | Marvasti et al. |
| 2009/0052669 A1 | 2/2009 | Ma |
| 2009/0161143 A1 | 6/2009 | Nakamoto |
| 2009/0249120 A1 | 10/2009 | Yao et al. |
| 2011/0087874 A1 | 4/2011 | Timashev et al. |
| 2011/0099420 A1* | 4/2011 | MacDonald McAlister ........... G06F 11/2025 714/6.32 |
| 2012/0027213 A1* | 2/2012 | Scarlata ........................ 380/283 |
| 2013/0036298 A1 | 2/2013 | De Atley et al. |
| 2013/0081124 A1 | 3/2013 | de Cesare et al. |
| 2013/0339949 A1* | 12/2013 | Spiers ................... G06F 9/5077 718/1 |
| 2014/0310510 A1 | 10/2014 | Potlapally et al. |

OTHER PUBLICATIONS

PCT International Search Report and Written Opinion, date of mailing Sep. 15, 2014, International Patent Application No. PCT/US14/33882, 14 pages.

USPTO Final Office Action dated Sep. 29, 2015 for U.S. Appl. No. 13/863,296, 9 pages.

PCT International Preliminary Report on Patentability, date of mailing Oct. 29, 2015, International Application No. PCT/US2014/033882, 7 pages.

Written Opinion of the Intellectual Property Office of Singapore for Application No. 11201508500V, dated Nov. 10, 2015, 11 pages.

\* cited by examiner

HOST RECOVERY USING A SECURE STORE

BACKGROUND

As an increasing number of applications and services are being made available over networks such as the Internet, an increasing number of content, application, and/or service providers are turning to technologies such as cloud computing. Cloud computing, in general, is an approach to providing access to electronic resources through services, such as Web services, where the hardware and/or software used to support those services is dynamically scalable to meet the needs of the services at any given time. A user or customer typically will rent, lease, or otherwise pay for access to resources through the cloud, and thus does not have to purchase and maintain the hardware and/or software needed. As such, the applications and services of a user are often hosted on the host servers of a service provider or other operator of the environment. In such a scenario, it can be important for the service provider or other operator to provide protection against various power failures, network outages and other unexpected events that may occur in order to ensure that the user's services continue to run reliably and uninterrupted. One particular issue that may arise is the ability to quickly and securely recover hosts in the event of large scale events, such as widespread network faults and/or power failures.

BRIEF DESCRIPTION OF THE DRAWINGS

Various embodiments in accordance with the present disclosure will be described with reference to the drawings, in which.

DETAILED DESCRIPTION

Figure 1:
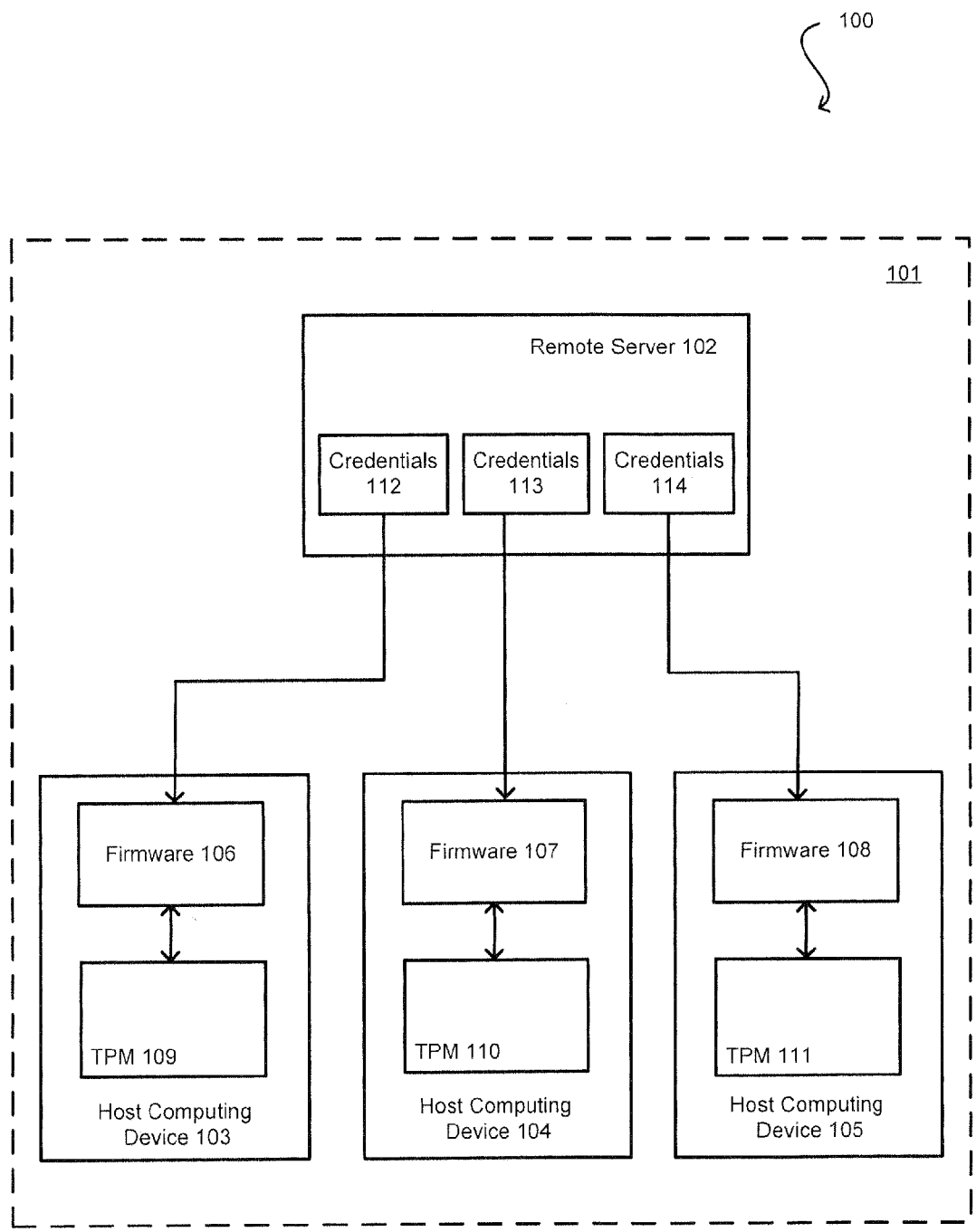
FIG. 1 illustrates an example of provisioning a TPM or other secure store on a host computing device, in accordance with various embodiments.

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

Systems and methods in accordance with various embodiments of the present disclosure may overcome one or more of the foregoing or other deficiencies experienced in conventional approaches for managing security information that may be useful when recovering computing devices after failures and/or other unexpected events. In particular, various embodiments enable a host computing device to store credentials (and/or other security information useful for recovering the state of the host computing device) in a secure store, such as a trusted platform module (TPM) on the host computing device. When recovering the host computing device in the event of a failure (e.g., power outage, network failure, etc.), the host computing device can obtain the necessary credentials from the secure store and use those credentials to boot various services, restore the state of the host and perform various other functions. In addition, the secure store (e.g., TPM) may provide boot firmware measurement and remote attestation of the host computing devices to other devices on a network, such as when the recovering host needs to communicate with the other devices on the network.

The use of the TPM to store the various credentials needed to recover the host computing device can provide improved mean time to recovery for the host in case of failures and other disastrous events. Because the critical information (e.g., credentials) required to bring the host to a working state is sealed locally on the host (e.g., protected by the keys in the TPM), the host computing device does not need to obtain the credentials from remote computing devices over a network, thereby saving latency and improving time to recovery. In multitenant computing environments (e.g., cloud computing environments), where the host computing device may host numerous virtual machines and applications/services provisioned for multiple users, this may be an important factor when recovering from large scale disasters and other unexpected events.

In accordance with one embodiment, a host computing device includes a TPM (or other secure store) that is provisioned to store one or more credentials, such as cryptographic keys, digital certificates, tokens, or other security information that can be used by the host computing device in an event of a failure. The host computing device further includes a recovery image that may be encrypted using asymmetric or symmetric cryptography. The recovery image may contain the necessary functionality (e.g., operating system, network functionality, etc.) to recover the host computing device when the host is rebooted after the failure. The recovery image may be an encrypted portion of the basic input and output system (BIOS) or other firmware of the host computing device. The cryptographic key used to decrypt the recovery image may be securely stored (e.g., sealed) on the TPM of the host computing device. In some embodiments, the key stored in the TPM may be used to decrypt another key, and the other key is used to decrypt the recovery image. In other embodiments, the key stored in the TPM may be used to directly decrypt the recovery image. During a large scale event, such as a power outage, network failure or other disaster, the host computing device may terminate abnormally and unexpectedly, such that the host computing device is not able to gracefully perform its shut down procedures that would otherwise be executed during normal operation. When booting (e.g., rebooting) the host computing device after such an event, the basic input and output system (BIOS) or other firmware on the host computing device may analyze a set of conditions and determine that the unexpected failure likely occurred. If such a failure is detected, the firmware may decrypt the recovery image using the cryptographic key stored in the TPM (as previously described) and load the recovery image into memory of the host computing device. Once the recovery image is up and running, the TPM may provide the recovery image with access to one or more credential securely stored on the TPM. The recovery image may then use those credentials to boot up various services on the host computing device, authenticate the host computing device to other devices on the network and perform other tasks to restore the functionality and state of the host computing device.

In accordance with another embodiment, once the recovery image has been loaded onto the host computing device, the TPM may perform a boot firmware measurement of the recovery image. The boot firmware measurement may be stored in the TPM. Thereafter, the TPM may use the recorded boot firmware measurement to perform remote attestation of the host computing device. For example, when the host computing device is in recovery mode, the various external devices (e.g., central management server, etc.) may need to communicate with the host computing device to bring the functionality of the host back to normal. These communications often include credentials and other sensitive information that should not be leaked to entrusted environments. Therefore, the remote device may need to ensure that a trusted recovery mode software has been loaded on the host and that it is not malicious software (e.g., malware) masquerading as a recovery image. Thus, when a query is received from a remote device (e.g., central server, etc.) requesting the TPM to attest the recovery image, the TPM may seal (e.g., encrypt, sign, etc.) the boot firmware measurement of the recovery image using public key infrastructure (PKI) and securely transmit the boot firmware measurement to the remote device (e.g., central management server, etc.). The remote device may receive the boot firmware measurement and compare it to an expected reference value in order to verify that the recovery image loaded on the host has not been corrupted. Once the remote device is able to verify the recovery image, it may begin sending various communications containing sensitive credentials to the host in order to perform recovery of the host computing device.

FIG. 1 illustrates an example 100 of provisioning a TPM or other secure store on a host computing device, in accordance with various embodiments. As shown in the illustration, to provision the secure stores, such as TPMs on the host computing devices, a remote server 102 (e.g., trusted host computing device, central management service, etc.) operating in a distributed computing environment 101 may distribute key material for every host computing device (103, 104, 105) in the environment 101. The distribution of the credentials may take place during normal operation of the host computing devices. Alternatively, the host computing device may be taken offline to provision the TPM on the host. In the illustrated embodiment, each host computing device (103, 104, 105) includes a firmware component (e.g., BIOS) operating on the local host which interacts with a trusted platform module (TPM) on the host. For example, host computing device 103 includes a firmware component 106 which interacts with the TPM 109, while host computing device 104 includes firmware component 107 interacting with TPM 110 and host computing device 105 includes firmware component 108 interacting with the TPM 111.

In various embodiments, the TPM provisioning stage includes the owner of the TPM (i.e., entity who is authorized to store credentials on the TPM via password) actually placing the secrets (credentials, keys etc.) into the TPM. During this stage, the credentials (which are to be used during the recovery phase) are provisioned into the TPM. After the TPM is provisioned, the credentials to be used during recovery of the host are sealed in the TPM.

In the illustrated embodiment, there may be an authentication process between the firmware component and the TPM on each host computing device. In addition, the remote server 102 may authenticate itself to the firmware operating on the host computing device, such as by establishing a secure communications session with the firmware on the host. Once authentication is successful, the remote server 102 may send credentials (112, 113, 114) or other security material to the firmware components on the host computing devices and the firmware components may cause the credentials to be stored in the TPM locally on the host. For example, the remote server 102 may transmit credentials 112 to firmware component 106, which may cause the credential 112 to be stored in the TPM (e.g., sealed on the TPM). Similarly, the remote server 102 may transmit credentials 113 to firmware 107 and credentials 114 to firmware 108, which would cause the credentials to be stored in TPMs 110 and 111 respectively.

In various embodiments, the credentials may be stored on the host computing device and encrypted such that the credentials can only be decrypted if the TPM module were in place on the host computing device. The credentials stored in the TPM may include any authentication keys, encryption/decryption keys, digital certificates and other security tokens that may be used by the host computing device when in recovery mode. In at least some embodiments, the credentials stored in the TPM may include a set of keys used to decrypt the recovery image that is to be loaded onto the host computing device in case of failures.

Once the credentials are securely sealed locally in the TPM on the host computing device, those credentials may be used to recover the host computing device from large scale events (power failures, network failures, etc.). This enables the host computing device to reconstruct its state (or a portion thereof) from the secrets stored in the TPM so that the host does have to rely on being able to communicate with other hosts on the network in order to reconstruct its state and to begin functioning normally. Instead, each host computing device can store its secrets locally, sealed in the TPM and logic operating on the local host may be configured to reconstruct the state which was lost due to the power failure, etc. In some embodiments, reconstructing the state on the host computing device may reconstruct the basic critical functionality, such as networking functionality to enable the host computing device to communicate with other host computing devices, such as a remote management server and the like.

In some embodiments, the host computing devices that may be recovered by using credentials sealed in the TPM are hosts that are responsible for monitoring other network devices. These hosts may need credentials to communicate with switches and routers, assess traffic flow and the like. Thus, the host computing device may need to prove itself to various entities to perform their normal functions. In various embodiments, the host computing device may use the credentials sealed in the TPM in order to perform such authentication on the network when in recovery mode.

Additionally, or in the alternative, the host computing device may also use the keys/credentials stored locally on the TPM even during normal operation, and not exclusively when recovering from failures. As such, the host computing devices can use the credentials sealed in the TPM to prove themselves to other hosts on the network and to perform their normal functionality (routers, storage hosts, etc.).

Figure 2:
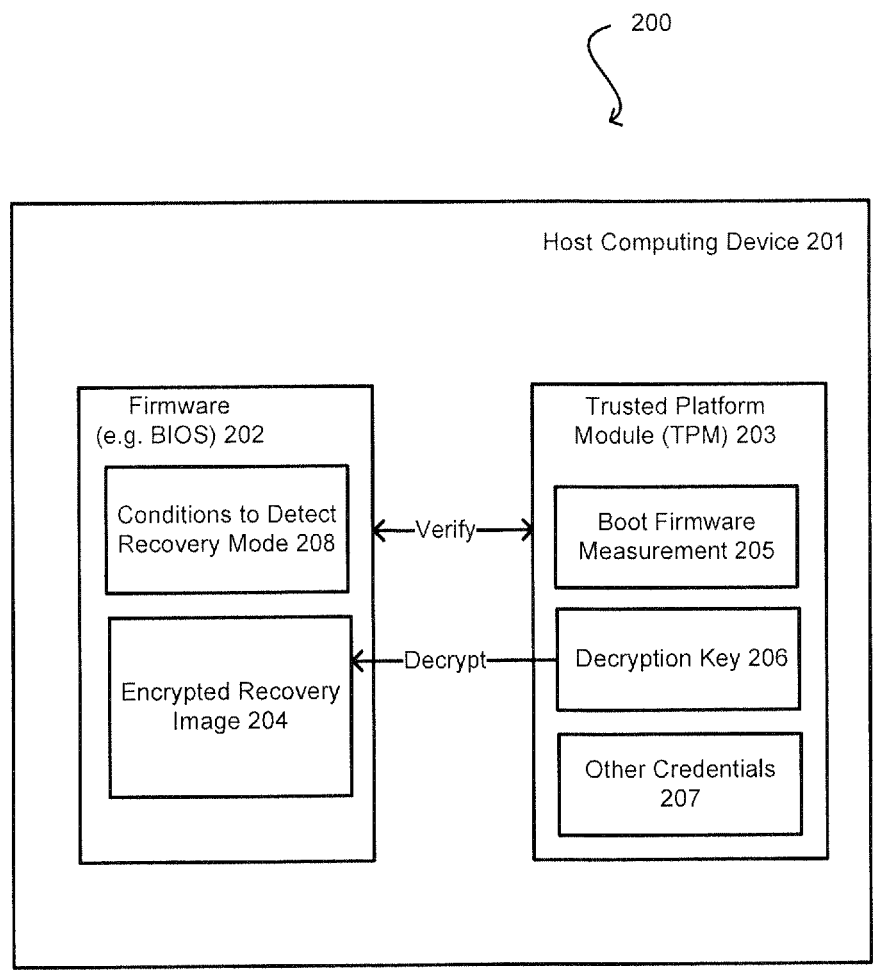
FIG. 2 illustrates an example of a host computing device in recovery mode, in accordance with various embodiments.

FIG. 2 illustrates an example 200 of a host computing device in recovery mode, in accordance with various embodiments. As shown in the illustration, the host computing device 201 includes a basic input and output system (BIOS) or other firmware component 202 which determines whether the host computing device 201 should be in normal operation mode or recovery mode. In some embodiments, there may be a set of conditions 208 built into the firmware 202 which determine whether the host computing device 202 should be in recovery mode. The firmware could analyze those conditions to try to ascertain whether there was an unusual power event in the recent past, or the like. For example, the firmware 202 may attempt to ping a preconfigured set of other host computing devices and if it cannot reach them, the firmware 202 can assume there was a massive failure of some sort and enter recovery mode. Alternatively, the firmware 202 may attempt to contact a particular remote system that is deemed integral to the environment and if contact is not able to be established, then the firmware 202 may assume that there was a large scale failure event. Also, the host computing device may listen to heartbeat information being provided by other host computing devices on the network in order to detect when large scale events have occurred.

Once the host computing device is in recovery mode, the firmware 202 can use the decryption key 206 in the TPM 203 to decrypt the recovery image 204 and load the recovery image 204 into the memory of the host computing device 201. In some embodiments, the decryption key 206 may be used to decrypt another key (e.g., an intermediate decryption key) which is in turn used to decrypt the recovery image 204 on the host computing device 201. In other embodiments, the decryption key 206 is directly used to decrypt the recovery image 204. The recovery image 204 can be an encrypted portion of the firmware 202 that includes the functionality required to restore the state of the host computing device 201 following a failure. During normal operation, the recovery image 204 is not decrypted and only if the firmware 202 detects that there was a power failure, abnormal termination or other event, the recovery image 204 is decrypted by using the decryption key 206 sealed in the TPM 203.

In some embodiments, the TPM 203 further includes the capability to obtain boot firmware measurements 205 and to record the boot firmware measurements 205 on the TPM 203. The boot firmware measurement may be performed by hashing the values of a number of predetermined memory address ranges and by storing the hash in the TPM 203. For example, the boot firmware measurement 205 may be obtained for the memory addresses associated with the firmware 202 or the recovery image 204 or the like. Thereafter, the boot firmware measurement 205 may be used to verify that the correct version of the firmware 202 or the recovery image 204 is loaded on the device and that they have not been corrupted by malware or other security threats.

In one embodiment, to decrypt the recovery image 204 when in recovery mode, the host computing device performs the following process. When the firmware 202 detects that the host computing device 202 is in recovery mode, the TPM 203 first obtains a boot firmware measurement 205 of the firmware 202 and verifies that the firmware 202 has not been corrupted. Once firmware 202 has been verified, the TPM 203 releases a first set of credentials (e.g., decryption key 206) to the firmware 202, where the first set of credentials is used to decrypt the encrypted recovery image 204. The firmware 202 obtains the decryption key 206, decrypts the recovery image 204 and loads the recovery image 204 into memory of the host computing device. Thereafter, the TPM 203 may obtain a boot firmware measurement of the recovery image 204 (e.g., by hashing values of memory addresses associated with the recovery image) loaded on the device and verify that the recovery image 204 has not been corrupted. If the recovery image 204 is verified by checking its boot firmware measurement, the TPM 203 can release a second set of credentials 207 that may be used by the recovery image to authenticate itself to other devices on the network, boot various other services on the host computing device 201 or otherwise restore the functionality of the host computing device 201.

As such, in the illustrated embodiment, the TPM 203 may store (a) boot firmware measurements 205 of the firmware 202 and/or the recovery image 204; (b) a set of credentials 206 used to decrypt the recovery image 204 when the host computing device in recovery mode, and (c) a second set of credentials 207 that may be used by the host computing device 201 and the recovery image 204 in order to communicate with other devices and to restore the functionality to the host computing device 201.

Figure 3:
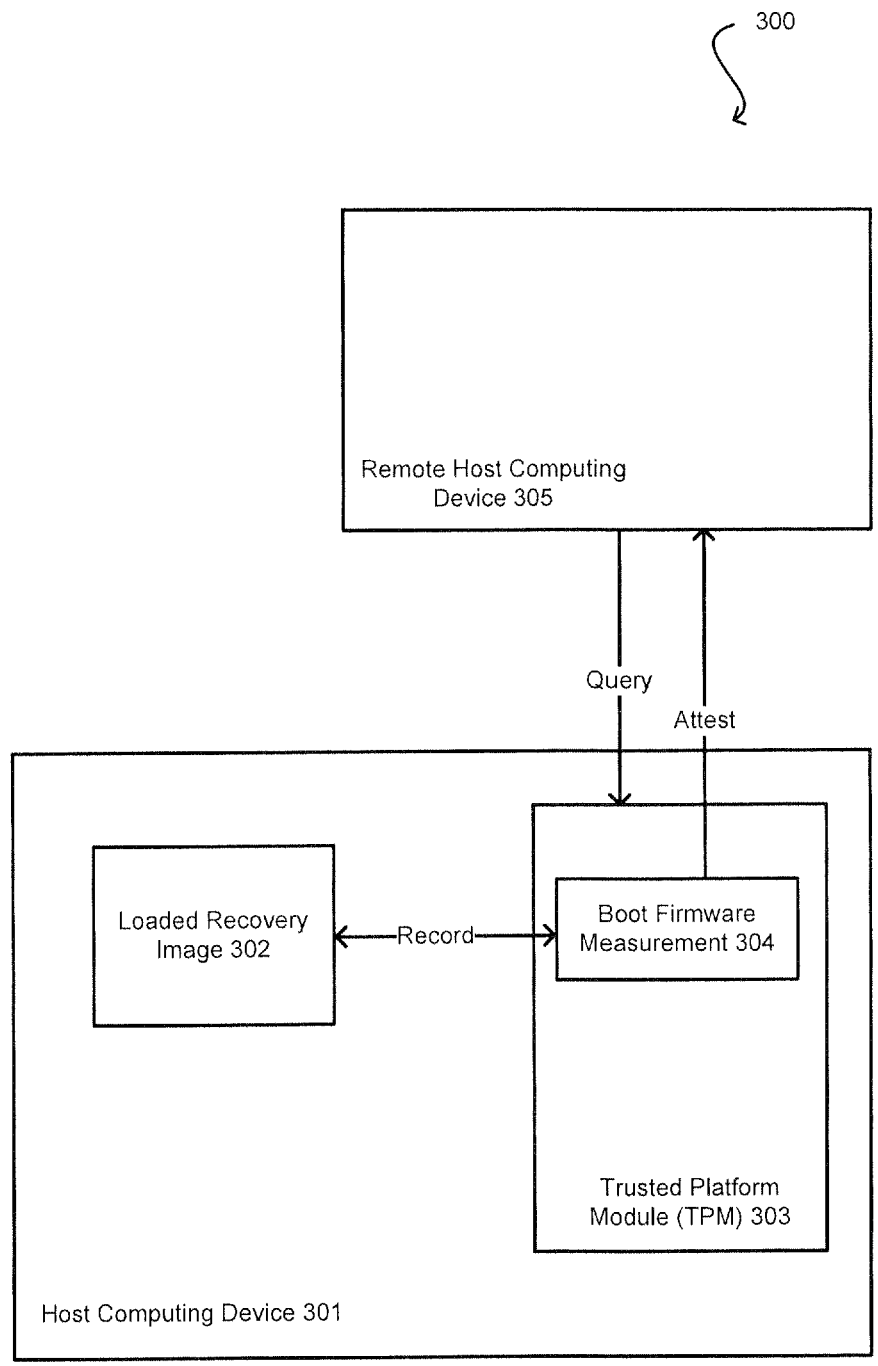
FIG. 3 illustrates an example of the TPM performing remote attestation of the host computing device to a remote computing device, in accordance with various embodiments.

FIG. 3 illustrates an example 300 of the TPM performing remote attestation of the host computing device to a remote computing device, in accordance with various embodiments.

After a large scale event, when trying to perform recovery of host computing devices, it may be necessary to forego certain security access controls that would normally be implemented in order to boot the host computing device 301 using a recovery image 302 and to allow the recovery image 302 to communicate with remote devices on the network, such as remote host computing device 305. However, if the recovery image 302 is loaded on an untrusted machine, it may give the untrusted machine privileges it should not have.

In various embodiments, the TPM 303 includes a boot firmware measurement and remote attestation functionality and the attestation functionality can be used to verify the host computing device 301 onto which the recovery image is loaded. This can ensure that any unauthorized hosts are unable to masquerade as a recovery image and potentially obtain access to sensitive credentials or other private information. Once the TPM 303 remotely attests the host computing device 301, the remote host computing device 305 may begin sending messages containing such credentials and other sensitive information to the host computing device 301.

In the illustrated embodiment, to perform the remote attestation of the host computing device 301, the TPM 303 may first obtain a boot firmware measurement 304 of the recovery image 302 loaded on the host computing device 301. This recovery image 302 may have credentials and/or may be able to perform certain functions that normal operating system images would not be allowed to perform. When the host computing device 301 is in recovery mode and boots into the recovery image 302, the boot firmware measurement 304 (e.g., hash measurement of the values in memory associated with the recovery image) can be recorded into the TPM 303. Thereafter, when any host on the network, such as remote host computing device 305 wants to communicate with the host computing device 301 in recovery mode, the remote host computing device 305 would query the TPM 303, requesting remote attestation of host computing device 301. The TPM 303 would use its remote attestation feature to confirm to the remote host computing device 305 that the host computing device 301 is actually running the recovery image 302. For example, in order to perform the remote attestation, the TPM 303 may seal the boot firmware measurement 304 using public key infrastructure (PKI) (e.g., by encrypting the boot firmware measurement, signing it, etc.) and send the sealed measurement 304 to the remote host computing device 305. The remote host computing device 305 may receive the boot firmware measurement 304, decrypt and/or verify the signature of the measurement and then verify that the measurement 304 matches a reference value of a valid recovery image. If the verification is successful, then the remote host computing device 305 can have a degree of certainty that the host computing device 301 is running the recovery image 302. Once the verification is done, the remote host computing device 305 may begin sending sensitive information to host computing device 301.

It should be noted that although each of the examples in FIGS. 1-3 are shown as utilizing a trusted platform module (TPM), this is not a requirement for all of the embodiments described herein. In various alternative embodiments, other types of secure stores may be utilized to store the credentials (e.g., cryptographic keys, digital certificates, etc.) for the host computing device. For example, a processor on the host computing device may contain the secure store, such as by implementing one or more secure registers within the processor dedicated for storing the credentials.

Figure 4:
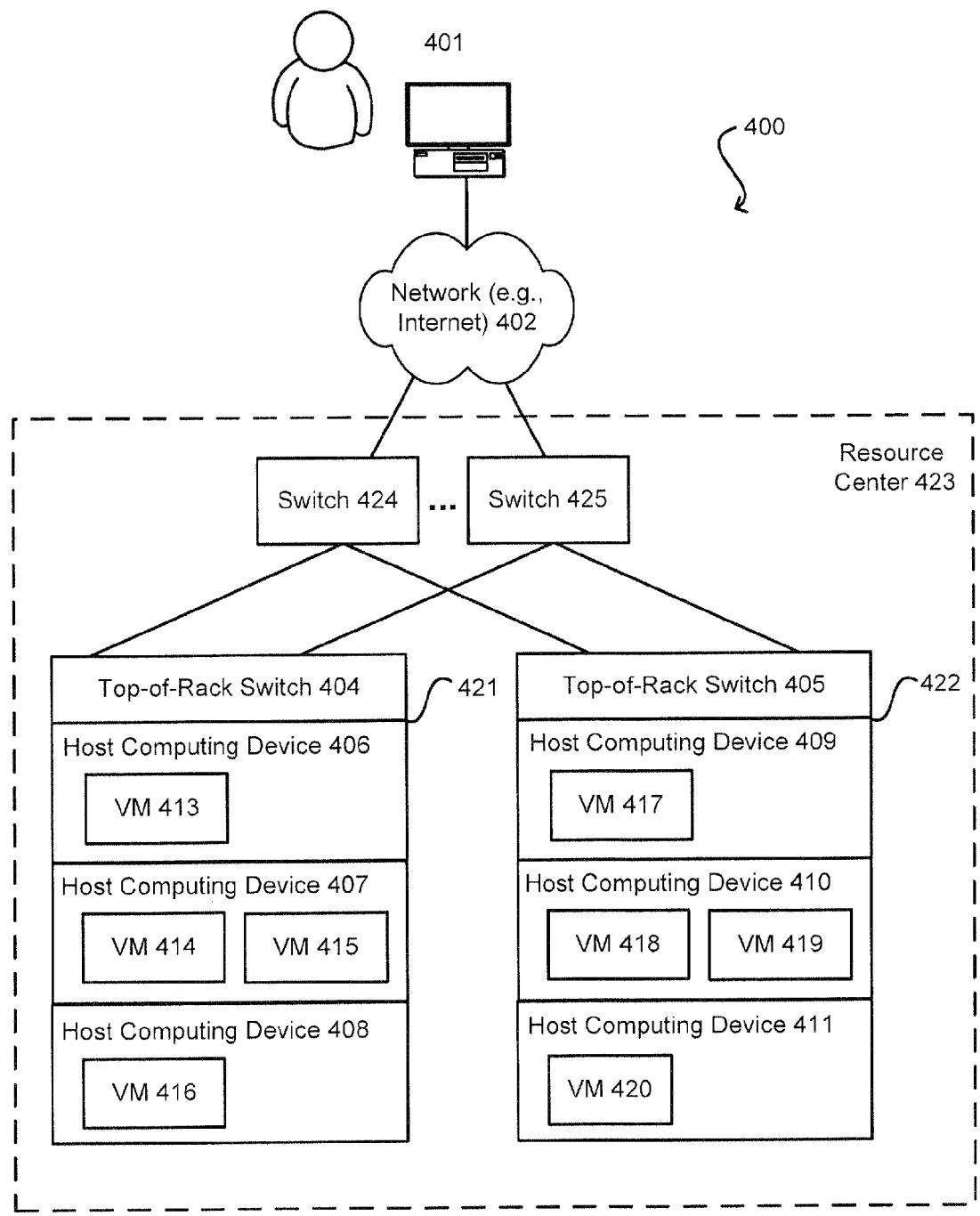
FIG. 4 illustrates an example of a resource center environment of a service provider or other operator of the multitenant computing environment, which may contain the host computing devices, in accordance with various embodiments.

FIG. 4 illustrates an example 400 of a resource center environment of a service provider or other operator of the multitenant computing environment, which may contain the host computing devices, in accordance with various embodiments. In the illustrated embodiment, a service provider (e.g., a cloud computing resource provider) can maintain one or more resource centers 423 (e.g., data centers, server farms, etc.) that store the physical resources (e.g., host computing devices, etc.) of the service provider. These physical resources can be used to host a number of virtual machine instances or virtual servers that can be provided to users 401 over a network 402, such as the Internet. For example, when a user wants to execute an application using the physical resources of the service provider, he or she may request the service provider to provision a virtual machine for the user, which will be used to deploy and execute the application. As demand for the user's application grows, the user can request that more virtual machines be provisioned to balance the load, request creation of one or more virtual private networks (VPNs) and the like. Access to all of these resources provisioned for the user (e.g., customer) may be controlled by using one or more security policies specified by the user, as previously described.

In the illustrated example, the resource center 423 of the service provider may include one or more racks 421, 422 of host computing devices (406, 407, 408, 409, 410) wherein each host computing device on a particular rack is connected to a single top-of-rack (TOR) switch (404, 405). These TOR switches can be further connected to one or more other switches (424, 425) which enable the host computing devices to connect to the network. As used throughout this disclosure, a network can be any wired or wireless network of devices that are capable of communicating with each other, including but not limited to the Internet or other Wide Area Networks (WANs), cellular networks, Local Area Networks (LANs), Storage Area Networks (SANs), Intranets, Extranets, and the like. The resource centers can include any physical or logical grouping of resources, such as a data center, a server farm, content delivery network (CDN) point-of-presence (POP) and the like.

In accordance with an embodiment, each host computing device can host one or more virtual machine instances (413, 414, 415, 416, 417, 418, 419, 420) that have been provisioned for the customers of the service provider to execute the various applications and services on behalf of those customers. Each virtual machine can be provisioned with its own operating system (OS) including a kernel, drivers, process management and the like.

When a customer wishes to obtain a virtual machine instance, the customer can first submit a request to the service provider, indicating the type of VM they would like to use. The service provider may carry out the processes to provision the virtual machine instance which will be hosted on the physical resources (e.g., host computing devices) of the service provider. The virtual machine instance can then be used to execute the various applications and services on behalf of the customer, utilizing the resources of the service provider.

As previously described, at least some (or all) of the host computing devices (406, 407, 408, 409, 410, 411) may include a TPM capable of storing credentials used to recover the host computing device in the event of a failure. These credentials may be used to enable the host computing devices to authenticate themselves to other host computing devices, boot various services and otherwise securely restore the state and functionality of each host computing device.

Figure 5:
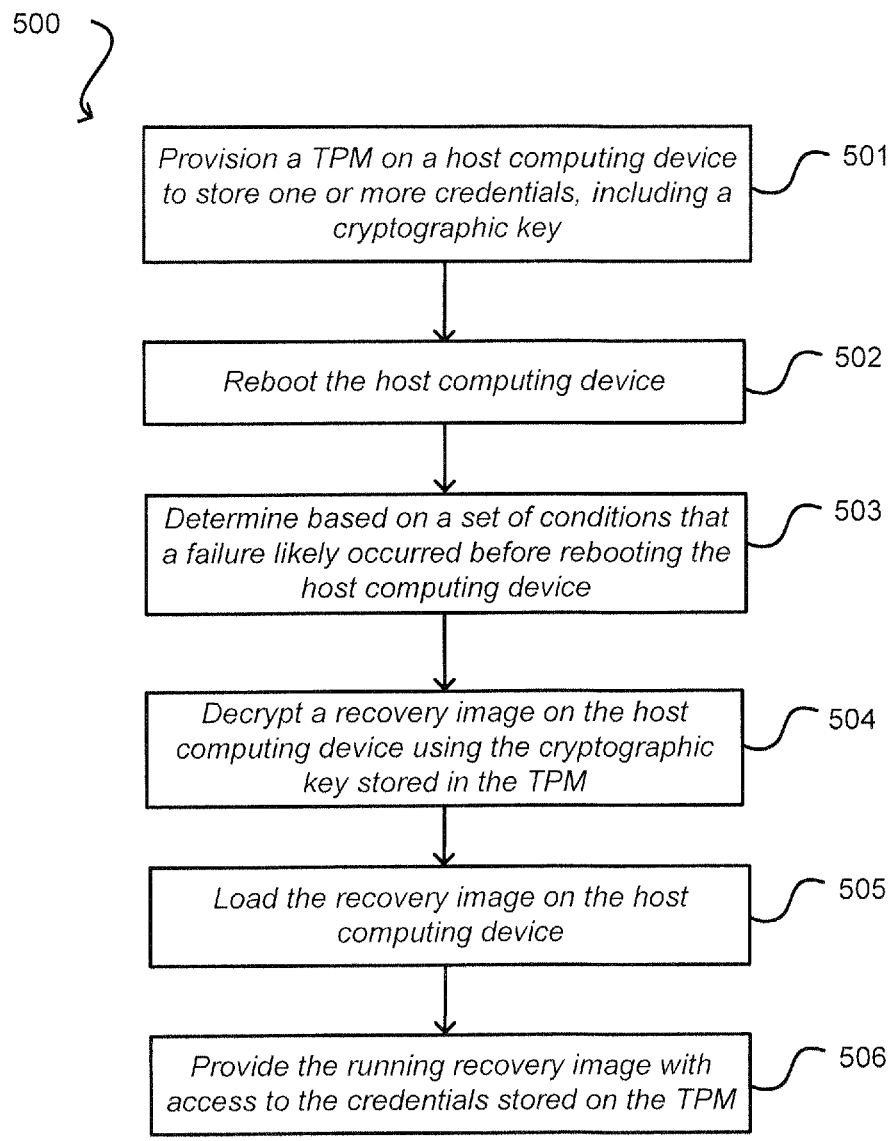
FIG. 5 illustrates an example process for storing credentials onto a TPM which may be used to recover a host computing device, in accordance with various embodiments.

FIG. 5 illustrates an example process 500 for storing credentials onto a TPM which may be used to recover a host computing device, in accordance with various embodiments. Although this figure may depict functional operations in a particular sequence, the processes are not necessarily limited to the particular order or operations illustrated. One skilled in the art will appreciate that the various operations portrayed in this or other figures can be changed, rearranged, performed in parallel or adapted in various ways. Furthermore, it is to be understood that certain operations or sequences of operations can be added to or omitted from the process, without departing from the scope of the various embodiments. In addition, the process illustrations contained herein are intended to demonstrate an idea of the process flow to one of ordinary skill in the art, rather than specifying the actual sequences of code execution, which may be implemented as different flows or sequences, optimized for performance, or otherwise modified in various ways.

In operation 501, a TPM on a host computing device is provisioned to store one or more credentials. The provisioning of the TPM may occur during normal operation of the host computing device. Alternatively, the provisioning of the TPM may be performed by taking the host computing device offline and provisioning the TPM. The credentials may include a cryptographic key that may be used to decrypt a recovery image on the host computing device in the event that the host computing device goes into recovery mode. In addition, the credentials stored on the TPM may include other cryptographic keys, certificates, and other security information that can enable the host computing device to perform recovery of its functionality and state.

In operation 502, the host computing device is booted. For example, the booting of the host computing device may be performed after a power failure or other catastrophic event has caused the host computing device to terminate abnormally. In operation 503, during the booting of the host computing device, the firmware (e.g., BIOS) operating on the host computing device may analyze a set of conditions and determine that a failure likely occurred in the recent past (i.e., before the booting of the host computing device).

In operation 504, the firmware operating on the host computing device decrypts a recovery image on the host computing device by using a decryption key retrieved from the TPM on the host computing device. As previously mentioned, the decryption key retrieved from the TPM may be used to decrypt another key (e.g., an encrypted intermediary key) and the other key is used to decrypt the recovery image. The recovery image may be a system image that contains the necessary functionality to perform recovery of the host computing device, such as restoring state, communicating with other devices on the network and the like. In one embodiment, before providing the decryption key to the firmware, the TPM may first check the boot firmware image of the firmware operating on the host computing device to ensure that the firmware has not been corrupted. If the firmware is verified, the TPM may provide the decryption key to the firmware and the firmware may utilize the key to decrypt the recovery image.

In operation 505, once the recovery image has been decrypted, the recovery image is loaded into memory of the host computing device. Once the recovery image has been loaded, the TPM may provide the recovery image with access to one or more credentials sealed in the TPM. The recovery image may use those credentials to perform recovery of the host computing device. In some embodiments, prior to providing the credentials to the recovery image, the TPM may verify the boot firmware measurement of the loaded recovery image, as previously described.

Figure 6:
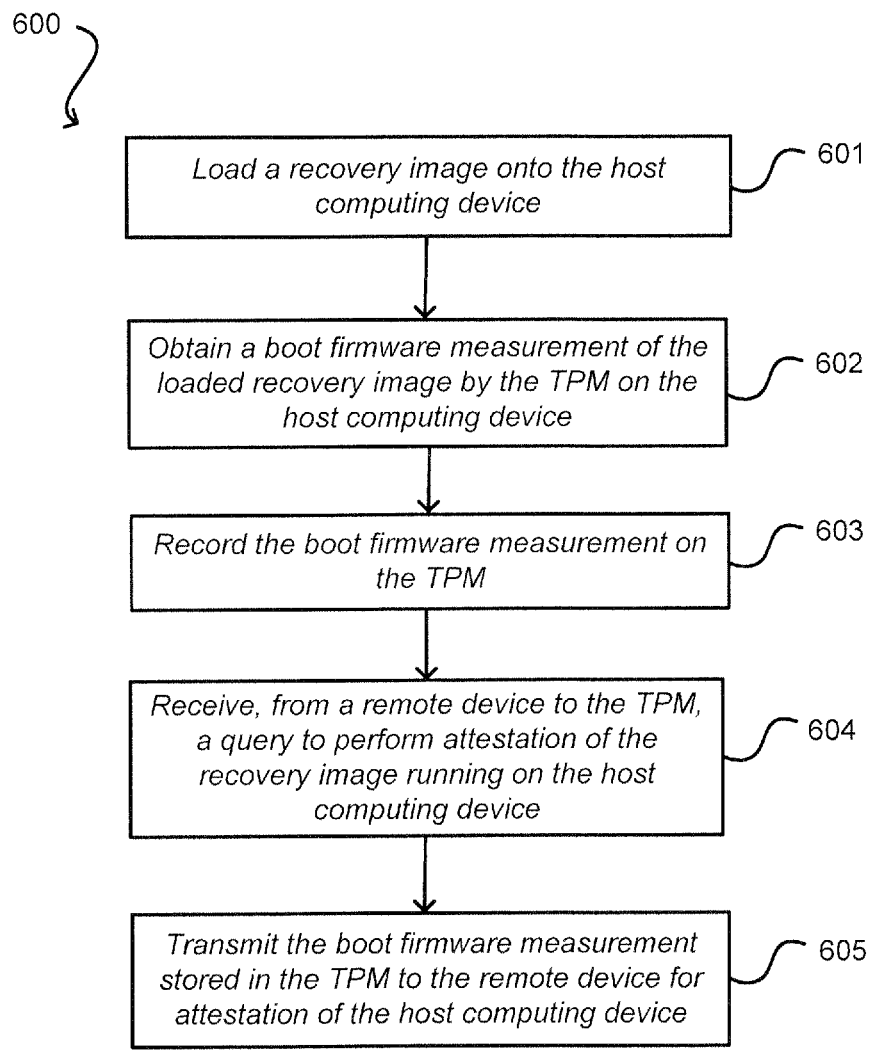
FIG. 6 illustrates an example process for performing remote attestation of the host computing device by the TPM, in accordance with various embodiments.

FIG. 6 illustrates an example process 600 for performing remote attestation of the host computing device by the TPM, in accordance with various embodiments. In operation 601, the recovery image is loaded into the memory of the host computing device, as described above. In operation 602, the TPM obtains a boot firmware measurement of the recovery image running on the host computing device. For example, the boot firmware measurement may be obtained by hashing values of memory addresses associated with the recovery image. The boot firmware measurement is then recorded on the TPM, as shown in operation 603.

In operation 604, the TPM receives a query to perform attestation of the recovery image running on the host computing device. The query may be received from a remote host computing device, such as a trusted host, central server, or the like. In response to the request, the TPM may perform the attestation of the host computing device. For example, as shown in operation 605, the boot firmware measurement stored in the TPM may be transmitted to the remote device to be used for attestation of the host computing device. In some embodiments, the boot firmware measurement is encrypted using a public key that may only be decrypted using a private key. In other embodiments, the boot firmware measurement may be signed using a private key, where the signature of the boot firmware measurement may be verified by using a public key. In any event, the remote host computing device may receive the boot firmware measurement, verify/decrypt the boot firmware measurement and us the boot firmware measurement to verify that the recovery image operating on the host computing device has not been corrupted.

Figure 7:
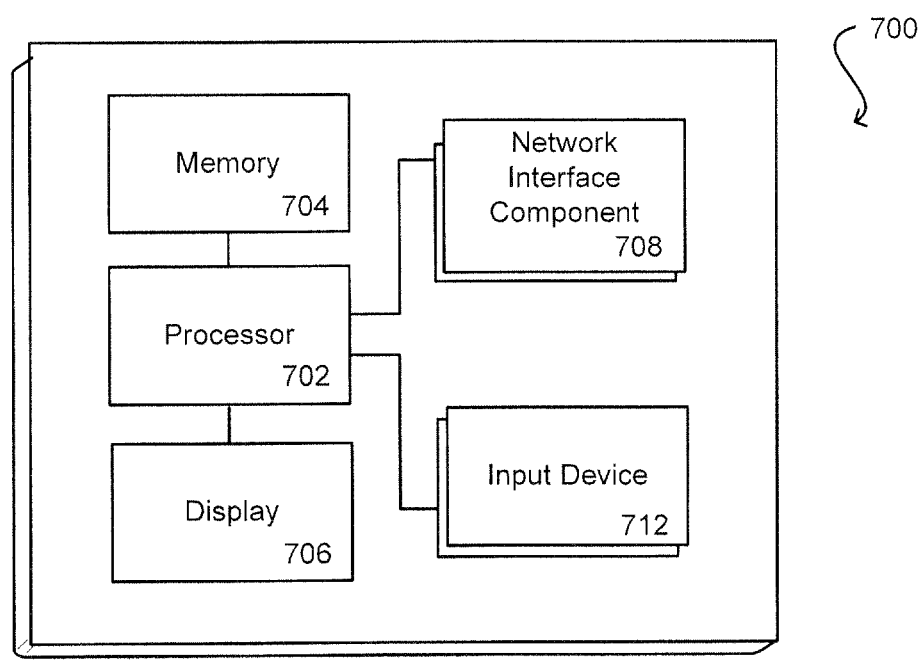
FIG. 7 illustrates a logical arrangement of a set of general components of an example computing device that can be utilized in accordance with various embodiments.

FIG. 7 illustrates a logical arrangement of a set of general components of an example computing device 700. In this example, the device includes a processor 702 for executing instructions that can be stored in a memory device or element 704. As would be apparent to one of ordinary skill in the art, the device can include many types of memory, data storage, or non-transitory computer-readable storage media, such as a first data storage for program instructions for execution by the processor 702, a separate storage for images or data, a removable memory for sharing information with other devices, etc. The device typically will include some type of display element 706, such as a touch screen or liquid crystal display (LCD), although devices such as portable media players might convey information via other means, such as through audio speakers. As discussed, the device in many embodiments will include at least one input element 712 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. In some embodiments, the computing device 700 of FIG. 7 can include one or more network interface elements 708 for communicating over various networks, such as a Wi-Fi, Bluetooth, RF, wired, or wireless communication systems. The device in many embodiments can communicate with a network, such as the Internet, and may be able to communicate with other such devices.

Figure 8:
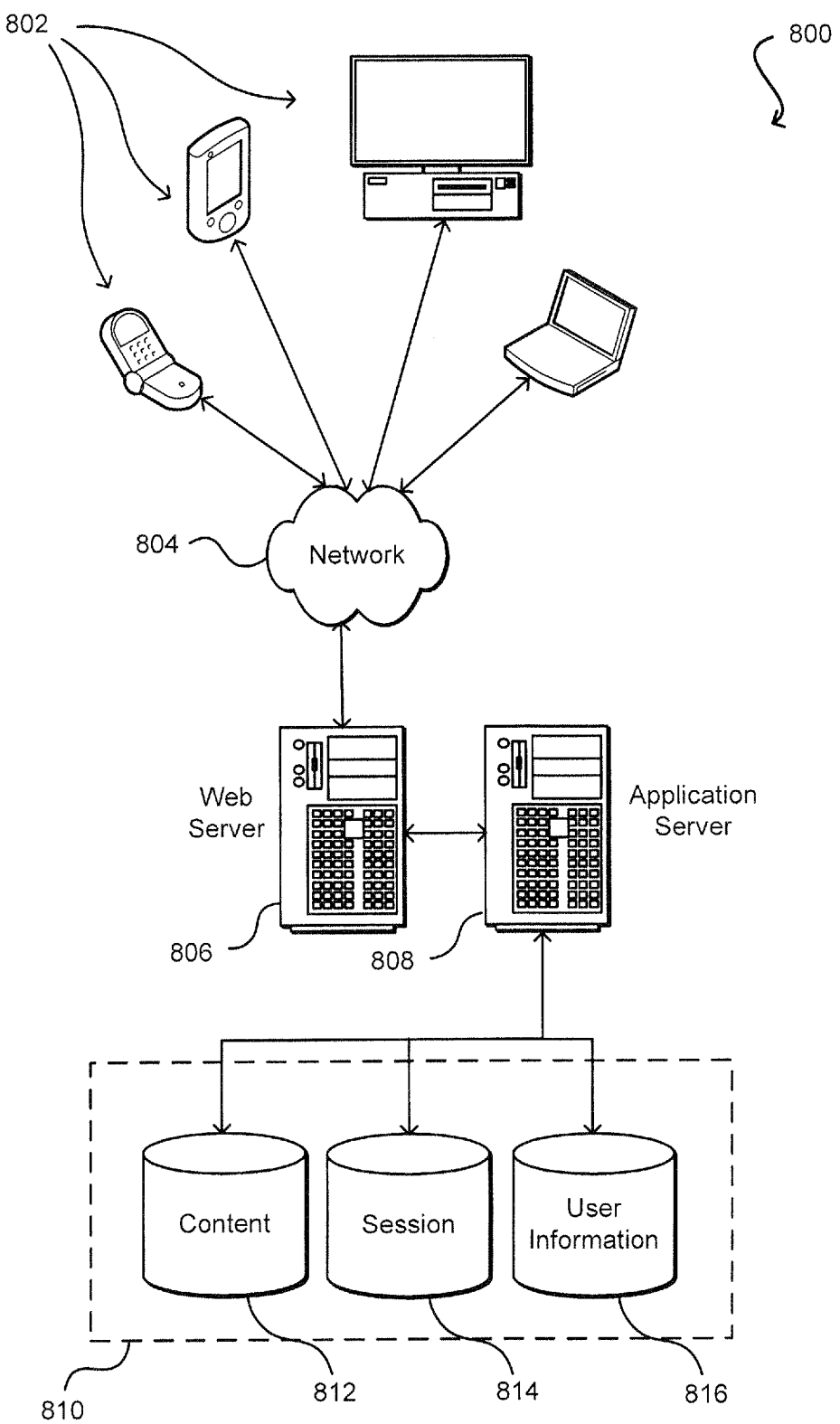
FIG. 8 illustrates an example of an environment for implementing aspects in accordance with various embodiments.

As discussed, different approaches can be implemented in various environments in accordance with the described embodiments. For example, FIG. 8 illustrates an example of an environment 800 for implementing aspects in accordance with various embodiments. As will be appreciated, although a Web-based environment is used for purposes of explanation, different environments may be used, as appropriate, to implement various embodiments. The system includes an electronic client device 802, which can include any appropriate device operable to send and receive requests, messages or information over an appropriate network 804 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 806 for receiving requests and serving content in response thereto, although for other networks an alternative device serving a similar purpose could be used, as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 802 and the application server 808, can be handled by the Web server 806. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing production data 812 and user information 816, which can be used to serve content for the production side. The data store also is shown to include a mechanism for storing log or session data 814. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 802. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer implemented method for performing host recovery using information stored in a secure store, the method comprising:
    provisioning a trusted platform module (TPM) on a host computing device of a multi-tenant computing environment to store one or more credentials including a cryptographic key, the host computing device including a recovery image that is encrypted, wherein the recovery image is capable of being decrypted using the cryptographic key, the multi-tenant computing environment including a plurality of remote computing devices for use in performing a task in the multi-tenant computing environment;
    rebooting the host computing device;
    determining a set of conditions relating to a prior shutdown of the host computing device during the rebooting;
    contacting the plurality of remote computing devices to determine a status of each of the plurality of remote computing devices, the status indicating that an abnormal shutdown occurred on each of the plurality of remote computing devices;
    determining, based at least in part on the status and the set of conditions, that an unexpected failure resulting in abnormal shutdown likely occurred on the host computing device prior to rebooting the host computing device;
    decrypting the recovery image on the host computing device by using the cryptographic key;
    loading the recovery image onto the host computing device; and
    providing the recovery image running on the host computing device with access to the one or more credentials stored in the TPM, wherein the one or more credentials are used to initiate one or more services on the host computing device.

2. The computer implemented method of claim 1, wherein provisioning the TPM on the host computing device further comprises:
    receiving, by firmware operating on the host computing device, the one or more credentials from a remote host computing device; and
    storing the one or more credentials from the firmware operating on the host computing device into the TPM.

3. The computer implemented method of claim 1, wherein providing the recovery image running on the host computing device with access to the one or more credentials stored in the TPM further comprises:
    obtaining a boot firmware measurement of the loaded recovery image by the TPM;
    verifying, by the TPM, that a correct version of the recovery image has been loaded based on the obtained boot firmware measurement; and
    providing the recovery image with access to the one or more credentials in response to verifying that the correct version of the recovery image has been loaded.

4. A computer implemented method, comprising:
    storing, in a secure store on a host computing device of a multi-tenant computing environment, one or more credentials, the host computing device including a recovery image capable of utilizing the one or more credentials stored in the secure store, the multi-tenant computing environment including a plurality of remote computing devices for use in performing a task in the multi-tenant computing environment;
    rebooting the host computing device;
    determining, during the rebooting, a set of conditions relating to a prior shutdown of the host computing device;
    contacting the plurality of remote computing devices to determine a status of the plurality of remote computing devices, the status indicating that an abnormal shutdown occurred on each of the plurality of remote computing devices;
    determining, based at least in part on the status and the set of conditions, that an unexpected failure resulting in abnormal shutdown likely occurred on the host computing device prior to rebooting the host computing device;
    loading the recovery image onto the host computing device; and
    providing the recovery image running on the host computing device with access to the one or more credentials stored in the secure store, wherein the one or more credentials are used to initiate one or more services on the host computing device.

5. The computer implemented method of claim 4, wherein the credentials stored in the secure store further comprise a first cryptographic key capable of being used to decrypt a second cryptographic key, the second cryptographic key capable of being used to decrypt the recovery image.

6. The computer implemented method of claim 4, wherein the credentials stored in the secure store further comprise a cryptographic key used to decrypt the recovery image.

7. The computer implemented method of claim 4, wherein determining that the unexpected failure likely occurred on the host computing device is performed by firmware operating on the host computing device.

8. The computer implemented method of claim 7, wherein loading the recovery image further comprises:
- obtaining a boot firmware measurement of the firmware operating on the host computing device;
- verifying the firmware operating on the host computing device by comparing the boot firmware measurement with a reference firmware measurement stored in the secure store;
- providing the firmware with access to a cryptographic key stored in the secure store, wherein the firmware is configured to decrypt the recovery image using the cryptographic key; and
- loading the decrypted recovery image onto the host computing device.

9. The computer implemented method of claim 4, wherein providing the recovery image running on the host computing device with access to the one or more credentials stored in the secure store further comprises:
- obtaining a boot firmware measurement of the loaded recovery image;
- verifying that a correct version of the recovery image has been loaded based on the obtained boot firmware measurement; and
- providing the recovery image with access to the one or more credentials in response to verifying that the correct version of the recovery image has been loaded.

10. The computer implemented method of claim 4, further comprising:
- receiving, the host computing device, the one or more credentials from a remote host computing device; and
- storing the received one or more credentials into the secure store.

11. The computer implemented method of claim 4, wherein the secure store is a trusted platform module (TPM) on the host computing device.

12. The computer implemented method of claim 4, wherein the host computing device hosts one or more virtual machines provisioned for a user, the one or more virtual machines executing at least one application accessible by the user over a network by using an application programming interface (API).

13. The computer implemented method of claim 4, wherein the host computing device is configured to use the one or more credentials to authenticate the host computing device to one or more remote devices over a network connection.

14. A computing device of a multi-tenant computing environment, the multi-tenant computing environment including a plurality of remote computing devices for use in performing a task in the multi-tenant computing environment, comprising:
- a secure store;
- at least one processor; and
- memory including instructions that, when executed by the at least one processor, cause the computing device to:
  - store one or more credentials in the secure store;
  - boot the computing device;
  - determine a set of conditions relating to a prior shutdown of the computing device during the booting;
  - contact the plurality of remote computing devices to determine a status of the plurality of remote computing devices, the status indicating that an abnormal shutdown occurred on each of the plurality of remote computing devices;
  - determine, based at least in part on the status and the set of conditions, that an unexpected failure resulting in abnormal shutdown likely occurred on the computing device prior to booting the computing device;
  - load a recovery image into the memory of the computing device; and provide the recovery image with access to the one or more credentials stored in the secure store, wherein the one or more credentials are used to initiate one or more services on the computing device.

15. The computing device of claim 14, wherein determining that the unexpected failure likely occurred on the computing device is performed by firmware operating on the computing device.

16. The computing device of claim 15, wherein loading the recovery image further comprises:
- obtaining a boot firmware measurement of the firmware operating on the computing device;
- verifying the firmware operating on the computing device by comparing the boot firmware measurement with a reference firmware measurement stored in the secure store;
- providing the firmware with access to a cryptographic key stored in the secure store, wherein the firmware is configured to decrypt the recovery image using the cryptographic key; and
- loading the decrypted recovery image into the memory of the computing device.

17. The computing device of claim 14, wherein providing the recovery image running on the computing device with access to the one or more credentials stored in the secure store further comprises:
- obtaining a boot firmware measurement of the loaded recovery image;
- verifying that a correct version of the recovery image has been loaded based on the obtained boot firmware measurement; and
- providing the recovery image with access to the one or more credentials in response to verifying that the correct version of the recovery image has been loaded.

18. The computing device of claim 14, wherein the memory further includes instructions executed by the at least one processor to cause the computing device to:
- receive the one or more credentials from a remote host computing device; and store the received one or more credentials into the secure store.

19. The computing device of claim 14, wherein the secure store is a trusted platform module (TPM) on the computing device.

20. A non-transitory computer readable storage medium storing one or more sequences of instructions executed by one or more processors to cause the one or more processors to:
- store, in a secure store on a host computing device of a multi-tenant computing environment, one or more credentials, the host computing device including a recovery image capable of utilizing the one or more credentials stored in the secure store, the multi-tenant computing environment including a plurality of remote computing devices for use in performing a task in the multi-tenant computing environment;
- reboot the host computing device;

determine, during the rebooting, a set of conditions relating to a prior shutdown of the host computing device;

contact the plurality of remote computing devices to determine a status of the plurality of remote computing devices, the status indicating that an abnormal shutdown occurred on each of the plurality of remote computing devices;

determine, based at least in part on the status and the set of conditions, that an unexpected failure resulting in abnormal shutdown likely occurred on the host computing device prior to rebooting the host computing device;

load the recovery image onto the host computing device; and provide the recovery image running on the host computing device with access to the one or more credentials stored in the secure store, wherein the one or more credentials are used to initiate one or more services on the host computing device.

21. The non-transitory computer readable storage medium of claim 20, wherein determining that the unexpected failure resulting in abnormal shutdown likely occurred on the host computing device is performed by firmware operating on the host computing device.

22. The non-transitory computer readable storage medium of claim 20, wherein loading the recovery image further comprises:

obtaining a boot firmware measurement of the firmware operating on the host computing device;

verifying the firmware operating on the host computing device by comparing the boot firmware measurement with a reference firmware measurement stored in the secure store;

providing the firmware with access to a cryptographic key stored in the secure store, wherein the firmware is configured to decrypt the recovery image using the cryptographic key; and loading the decrypted recovery image onto the host computing device.

23. The non-transitory computer readable storage medium of claim 20, wherein providing the recovery image running on the host computing device with access to the one or more credentials stored in the secure store further comprises:

obtaining a boot firmware measurement of the loaded recovery image;

verifying that a correct version of the recovery image has been loaded based on the obtained boot firmware measurement; and providing the recovery image with access to the one or more credentials in response to verifying that the correct version of the recovery image has been loaded.

24. The non-transitory computer readable storage medium of claim 20, further comprising instructions, that when executed by the one or more processors cause the one or more processors to:

receive, the host computing device, the one or more credentials from a remote host computing device; and store the received one or more credentials into the secure store.

* * * * *